United States Patent [19]

Wratil et al.

[11] Patent Number: 4,926,351

[45] Date of Patent: May 15, 1990

[54] DIGITAL PROCESSING DEVICE FOR ANALOG INPUT

[75] Inventors: Peter Wratil, Bergisch-Gladbach; Reinhard Schröter, Niederkassel, both of Fed. Rep. of Germany

[73] Assignee: Klöckner-Moeller, Bonn, Fed. Rep. of Germany

[21] Appl. No.: 171,670

[22] Filed: Mar. 22, 1988

[30] Foreign Application Priority Data

Mar. 25, 1987 [DE] Fed. Rep. of Germany ....... 3709805

[51] Int. Cl.⁵ .................... G08B 21/00; G06F 15/20
[52] U.S. Cl. .................................. 364/550; 364/481; 364/483; 324/78 D; 324/79 D
[58] Field of Search ............... 364/481, 483, 550, 571, 364/577; 324/78 D, 79 D, 83 D, 99 D; 341/122, 155, 172

[56] References Cited

U.S. PATENT DOCUMENTS

| | | | |
|---|---|---|---|
| 4,065,766 | 12/1977 | Butler et al. | 341/172 |
| 4,258,423 | 3/1981 | Lane et al. | 324/78 D |
| 4,333,149 | 6/1982 | Taylor et al. | 364/481 |
| 4,564,831 | 1/1986 | Wheable et al. | 341/155 |
| 4,622,536 | 11/1986 | Shih et al. | 341/122 |
| 4,623,838 | 11/1986 | Nakamura | 364/483 |
| 4,623,967 | 11/1986 | Naimer | 364/483 |
| 4,721,944 | 1/1988 | Kiikuniya et al. | 364/577 |
| 4,736,327 | 4/1988 | Power | 364/481 |
| 4,740,744 | 4/1988 | Lubarsky et al. | 324/79 D |

FOREIGN PATENT DOCUMENTS

| | | |
|---|---|---|
| 965857 | 7/1971 | Fed. Rep. of Germany . |
| 2850101 | 6/1979 | Fed. Rep. of Germany . |
| 3204159 A1 | 10/1982 | Fed. Rep. of Germany . |
| 3151628 C2 | 7/1983 | Fed. Rep. of Germany . |
| 3323184 A1 | 1/1984 | Fed. Rep. of Germany . |
| 3622800 A1 | 1/1987 | Fed. Rep. of Germany . |
| 3541343 A1 | 8/1987 | Fed. Rep. of Germany . |
| 2152680 A | 8/1985 | United Kingdom . |
| 2174261 A | 10/1986 | United Kingdom . |

OTHER PUBLICATIONS

Abtastvoltmeter, Peter Hartz, Friedrich Oehme, 6/85.
Norman Bernstein, What to look for in analog input, 1978.

Primary Examiner—Parshotam S. Lall
Assistant Examiner—Christopher L. Makay
Attorney, Agent, or Firm—Horst M. Kasper

[57] ABSTRACT

A processing module is disclosed for capturing of analog input values, in particular for microprocessing systems and storage-programmable control systems. The control unit (40) comprises a program storage (41) and a read-write storage (42). The program storage is provided with its own storage region (1'-8') for each measurement input (1-8). The analog measurement region, coordinated to each measurement input, is programmed in the program storage and the kind of the analog measurement value is programmed in the program storage. The storage region (1'-8') is programmed by the user before the measurement event, whereby the semiconductor switches (11-28) can be correspondingly activated for each measurement. In case of a change of the kind of the analog measurement value, or in case of a change of the analog measurement region, only the storage contents (1'-8') of the program storage (41) are to be changed according to the new measurement values. A hardware modification of the measurement inputs is not required in this case.

15 Claims, 3 Drawing Sheets

FIG. 4

| STORAGE REGION | STORED MEASUREMENT REGION AND MEASUREMENT VALUE |
|---|---|
| 1' | 0.......10V |
| 2' | Ni 1000 |
| 3' | 0.......20mA |
| 4' | 0.......2V |
| 5' | PT100 |
| 6' | 0......10mA |
| 7' | 0......15V |
| 8' | Ni 1000 |

FIG. 5

MEASUREMENT INPUT 1-8

HS 11-28

| | 11 | 12 | 13 | 14 | 15 | 16 | 17 | 18 | 21 | 22 | 23 | 24 | 25 | 26 | 27 | 28 | 19 | 10 | 20 |
|---|---|---|---|---|---|---|---|---|---|---|---|---|---|---|---|---|---|---|---|
| 1 | 1 | 0 | 0 | 0 | 0 | 0 | 0 | 0 | 0 | 0 | 0 | 0 | 0 | 0 | 0 | 0 | 0 | 1 | 0 |
| 2 | 0 | 1 | 0 | 0 | 0 | 0 | 0 | 0 | 0 | 1 | 0 | 0 | 0 | 0 | 0 | 0 | 0 | 1 | 0 |
| 3 | 0 | 0 | 1 | 0 | 0 | 0 | 0 | 0 | 0 | 0 | 0 | 0 | 0 | 0 | 0 | 0 | 1 | 0 | 1 |
| 4 | 0 | 0 | 0 | 1 | 0 | 0 | 0 | 0 | 0 | 0 | 0 | 0 | 0 | 0 | 0 | 0 | 0 | 1 | 0 |
| 5 | 0 | 0 | 0 | 0 | 1 | 0 | 0 | 0 | 0 | 0 | 0 | 0 | 1 | 0 | 0 | 0 | 1 | 0 | 1 |
| 6 | 0 | 0 | 0 | 0 | 0 | 1 | 0 | 0 | 0 | 0 | 0 | 0 | 0 | 0 | 0 | 0 | 1 | 0 | 1 |
| 7 | 0 | 0 | 0 | 0 | 0 | 0 | 1 | 0 | 0 | 0 | 0 | 0 | 0 | 0 | 0 | 0 | 0 | 1 | 0 |
| 8 | 0 | 0 | 0 | 0 | 0 | 0 | 0 | 1 | 0 | 0 | 0 | 0 | 0 | 0 | 0 | 1 | 1 | 0 | 1 |

DIGITAL PROCESSING DEVICE FOR ANALOG INPUT

BACKGROUND OF THE INVENTION

1. Field of the Invention

The invention relates to a processing module for capturing measurement values of analog input values, in particular for microprocessing systems or storage-programmable controls which, in general, include an input amplifier, a follower amplifier, an A/D converter, a control unit, and one or several input terminals for receiving of analog measurement values.

2. Brief Description of the Background of the Invention Including Prior Art

It is known to convert analog input values into digital values and is today conventional technology. The analog/digital conversion is applied predominantly for measurement apparatus with a digital display and in electronic control systems, where the analog measurement values, converted into digital values, are offered to the control system for further processing.

Commercial microprocessor compatible analog/digital converters use in addition multiplex inputs, such as, for example the AD 7581 of Analog Devices, compare Databook of Analog Devices 1984, pp. 10/159. The multiplex inputs are cyclically addressed by a control logic, the momentary values are stored in data storage and are offered to the data bus. It is disadvantageous in this context that exclusively voltage measurement values can be processed.

In addition, programmable measurement amplifiers are known, such as the device AD 625 of Analog Devices, compare Databook of Analog Devices, Update and Selection Guide, pp. 3/111 as well as the Data-Aquisition Databook 1984, published at Two technology Way, P.O. Box 280, Norwood, Mass. 02062.

In this case, the amplification factor is obtained by a hardware switching of the module with the aid of reference resistors.

Furthermore, a method is known to adapt different input voltages by way of the internal amplification of the measurement system. This is associated with the disadvantage that a separate measurement amplifier has to be coordinated to each input, where the adaptation of the measurement value to the measurement system has to be realized via hardware.

It is a disadvantage in the context of the abovementioned modules, systems, and methods that the processing of different signal forms such as, for example, the current or the voltage or the adaptation to sensors, is not possible at one and the same measurement input without additional hardware modification or passive switching elements such as, for example, relays or the like.

SUMMARY OF THE INVENTION

1. Purposes of the Invention

It is an object of the invention to provide a processing module for the capturing of measurement values of analog input values, where each input, depending on the application, can be switched in a flexible way.

It is another object of the present invention to provide a processing module which receives voltage measurement values or current measurement values or which can be adapted to sensors, which can be programmed to accept the different input signals.

It is yet a further object of the present invention to provide a processing module for the capturing of analog input values, where the input configuration and the adaptation of the measurement value is performed without a hardware modification or passive switching elements, such as, for example, relays, and where only a programming is performed by the user before the measurement input.

These and other objects and advantages of the present invention will become evident from the description which follows.

2. Brief Description of the Invention

The present invention provides for a processing module for capturing of analog input values comprising a measurement input. The input amplifier has an input connected to the measurement input. A follower amplifier has an input connected to the input amplifier and has an output. A control unit is connected to the output of the follower amplifier and is provided with a multiplexer, a read-write storage, and with a program storage which includes its own storage region for a corresponding measurement input. The processing module includes an input for the reception of analog measurement values where the analog region and the kind of the analog measurement value is programmed as coordinated to a respective measurement input. The measurement inputs are cyclically scanned according to a multiplexing method furnished by the multiplexer with respect to the measurement region, with respect to the kind of the analog measurement value, and with respect to the momentary value of the analog measurement parameter. Semiconductor switches, connected to the measurement input and controlled by the control unit, are switched for each measurement input within a measurement cycle depending on the storage contents of the program storage. An A/D converter is connected to the control unit where the momentary value of the analog measurement value is converted via the A/D converter and is written into the read-write storage of the control unit.

An output connection can operate microprocessing systems and storage-programmable controls.

The program storage is preferably provided with a storage region, where the program content induces the A/D converter to convert all analog measurement values offered for conversion into a uniform reference grid.

The present invention provides for a method for capturing of analog input values in a processing module suitable for microprocessing systems and storage-programmable controls. An analog input signal representing analog measurement values is entered into one or more measurement inputs for the reception of analog measurement values. The analog input signal is fed from the measurement input to an input amplifier. An output from the input amplifier is fed to a follower amplifier. An output from the follower amplifier is fed to an A/D converter. An output from the follower amplifier is fed to a control unit. A program is stored in a program storage forming part of the control unit, which program storage includes its own storage region for a respective measurement input, where the program in the program storage has programmed an analog region and the kind of the analog measurement value as coordinated to the respective measurement input. The signals coming from the follower amplifier are multiplexed in the control unit. The measurement inputs are cyclically scanned according to a multiplexing method with respect to the measurement region, with respect to the kind of the analog measurement value, and with respect to the momentary value of an analog measurement parameter. The semiconductor switches are switched for each measurement input within a measurement cycle depending on the storage contents of the program storage. A momentary value of the analog measurement value is converted via an A/D converter and the converted momentary value of the analog measurement value is written into the read-write storage of the control unit.

The A/D converter is induced to convert all analog measurement values offered for conversion into a uniform reference grid based on the program content.

The proccessing module according to the invention solves in an efficient and elegant way the important task of digitizing quickly and with limited hardware requirements analog input values for further processing in electronic control and servo systems.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 4 contains an example of the measurement values and measurement regions stored, by way of example, in the programming storage of the processing module of the invention;

FIG. 5 illustrates the position of the semiconductor switches of the invention processing module with references to the inputs and the measurement values and measurement regions, offered by way of example, as illustrated in FIG. 4.

DESCRIPTION OF INVENTION AND PREFERRED EMBODIMENT

In accordance with the present invention, there is provided a processing module for capturing of analog input values, which module is suitable, in particular, for microprocessing systems and storage-programmable controls. The processing module comprises an input amplifier, a follower amplifier, an A/D converter, a control unit, and one or several inputs for the reception of analog measurement values.

The control unit represents all logical functions and provides for a proper run of individual sequences of operation of the program storage, of the measurement input, of the memory storage section of the measurement input, of the cyclical multiplex process and of the semiconductor switch. The program storage contains the run program of the control unit. The program storage provides the input via the input region, the input value and the kind of the analog measurement value.

Figure 3:
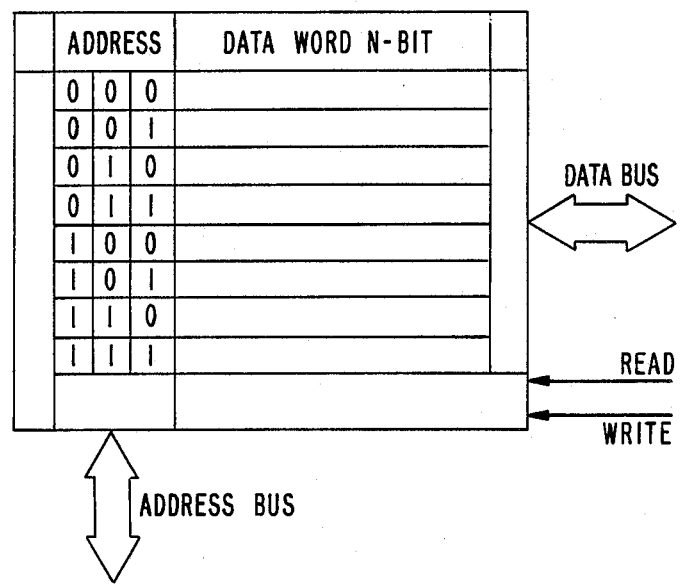
FIG. 3 is a principle construction of the readwrite storage of the invention processing module.

The control unit 40 is provided with a program storage 41 which includes its own storage region 1'-8', where the analog region and the kind of the analog measurement value is programmed as coordinated to the respective measurement input 1-8. The measurement inputs 1-8 are cyclically scanned with respect to the measurement region, the kind of the analog measurement value, and the momentary value of the analog measurement parameter. The semiconductor switches 11-28 are switched for each measurement input 1-8 within a measurement cycle depending on the storage contents of the program storage 41, as illustrated in FIG. 5. The momentary value of the analog measurement value is converted via the A/D converter 34 and is written into the read-write storage 42 of the control unit 40, as illustrated in FIG. 3. The momentary value is that value, which is assumed by a changing analog measurement value at that point in time, at which the processing module of the invention is accessing this measurement value. In particular, the momentary value of the measurement value is the analog value applied at the measurement input at the point in time when the conversion starts. This access to the read-write storage occurs cyclically, i.e. during each run of the program of the control system.

The program storage 41 is preferably provided with a storage region, where the program content induces the A/D converter 34 to convert all analog measurement values offered for conversion into a uniform reference grid.

Figure 1:
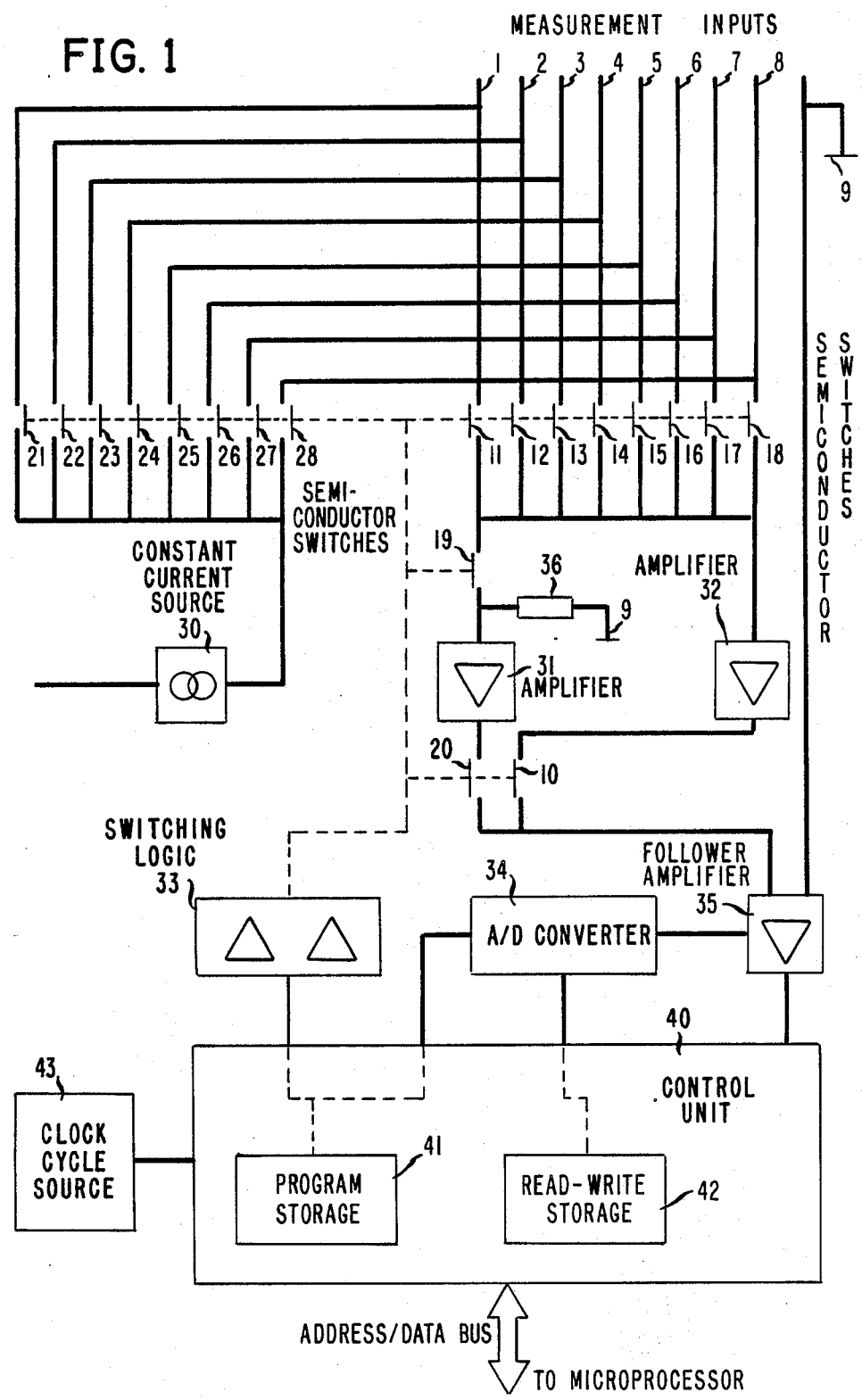
FIG. 1 is a schematic circuit diagram of a processing module according to the invention.

Referring now to FIG. 1, there is shown a schematic circuit diagram of a processing module 50 in accordance with the invention. Two semiconductor switches 11-18 and 21-28 are coordinated here to each measurement input 1-8. It is important that these are semiconductor switches and preferably Metal-Oxide-Semiconductor MOS devices are employed, which exhibit switching behavior comparable to that of mechanical switching elements. Two input amplifiers 31 and 32 are placed behind the semiconductor switches 11-18. It is a purpose of the input amplifiers to raise the input signal level to a predetermined value adapted to the logical processing of the measurement system. Preferably, the input amplifiers are furnished as operational amplifiers. The input amplifier 32 is controlled directly by one of the semiconductor switches 11-18, while the input amplifier 31 is additionally controlled by the semiconductor switch 19. The semiconductor switches 10 and 20 decide which measurement values are to be fed to the follower amplifier 35 and from which input amplifier 31, 32. The decision via the semiconductor switches is provided by individual programming of the program storage 41. This program storage 41 is a Random Access Memory RAM storage and the user writes to the RAM memory with an external programming device. The program storage is provided with its own memory storage section 1' to 8' for each measurement input. The analog measurement region as well as the analog measurement value are programmed for each measurement input in the respective memory storage section 1' to 8' The switching logic 33 following the program storage receives information from the memory storage section 1' to 8' as to which semiconductor switch has to be activated in order to perform to the measurement process of the corresponding measurement input 1 to 8, where the measurement value is applied to this measurement input.

A measurement input is designated as one of the possible inputs of the invention processing module, which is connected to the outside via the inputs, that is with external peripheral elements disposed outside of the control system. Each measurement input is associated with an internal storage region as illustrated in FIG. 3, where in accordance with the seed input of the program storage the measurement value is written down in digitized form. The digitized measurement is then available for further processing in the control system based on the prior installation of the control unit.

The follower amplifier 35 refers to the analog measurement values offered to the follower amplifier 35 relative to the reference ground 9 and provides the measurement value to the A/D converter 34. The A/D converter 34 converts the measurement value into a digital measurement value, which is read into the read-write storage 42 of the control unit 40 and which is offered to the control system on the address and data bus for further processing.

The read-write storage 42 effects that the value of the measured parameter is written down during each program cycle, which means during each cycle of the control system during which the processing procedure of the invention is employed. The microprocessor of the control system activates then the read signal and reads this value via the databus for further performance of its control processing. The internal functions of the control unit 40 are provided by semiconductor device elements and by semiconductor switches. Preferably, Metal-Oxyde-Semiconductor MOS devices are employed, which can change their conductivity substantially based on the application of electrical charges such that their switching behavior becomes comparable to that of mechanical switching elements.

The program, which is written by the user into the program storage 41 before the entering and occurrence of the measurement event, is solely decisive and determining for the activation of the semiconductor switches 11–28. The analog measurement values to be processed and the respective measurement region for each measurement input 1–8 of the processing module 50 result from this program content of the program storage 41.

Figure 2:
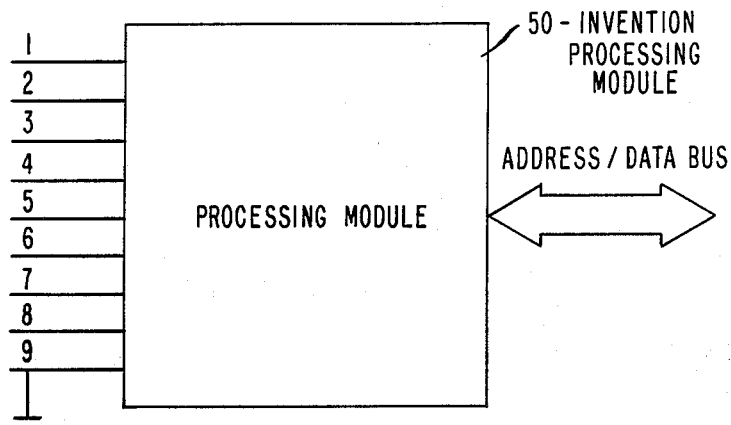
FIG. 2 is a block-circuit diagram of the processing module according to the invention.

By the disposition of the semiconductor switches 11–28 and the switching configuration of the input amplifiers 31 and 32, of the follower amplifier 35, of the constant current source 30, of the A/D converter 34, and of the control unit 40 in connection with the switching logic 33, there results that all possible analog measurement values can be processed by the invention processing module 50. The block-circuit diagram of the invention processing module 50 is illustrated in FIG. 2.

The principal construction of the read-write storage 42, wherein the momentary values of the measurement inputs are cyclically stored, is illustrated in FIG. 3. This cyclical multiplex method provides that the measurement inputs are connected to a conversion unit according to the program in the program storage and the conversion unit coordinates a digital value to the analog measurement value. The sequence, in which the multiplexer accepts the analog values, is determined by the program in the program storage. In general, the access is performed cyclically, i.e. according to an increasing sequence. The addressing of the read-write storage 42 is performed directly by the microprocessor of the control system. The data word is read in by activation of the read signal onto the data bus of the control system.

The measurement values and measurement regions are illustrated by way of example in FIG. 4. The measurement values and measurement regions are programmed into the corresponding storage regions 1'–8' of the program storage 41.

FIG. 5 illustrates the location of the semiconductor switches 11–28 for the measurement values of the measurement inputs 1–8 illustrated in FIG. 4. The measurement values and the measurement regions, as shown in FIG. 4, for the measurement inputs 1–8 are programmed by the user into the program storage 41.

The functional operation of the processing module 50, in connection with FIGS. 1 to 5, is to be explained further based on the following first three processing steps of the storage region 1'–3' of the program storage. If the storage region 1' of the program storage 41 is addressed by the microprocessor of the control system, then occurs, through the switching logic 33, the positioning of the semiconductor switches 11–28 for the measurement input 1, as illustrated in FIG. 5. The semiconductor switch 11 and the semiconductor switch 10 are closed. The measurement voltage from the measurement input 1 reaches via the semiconductor switch 11 the input amplifier 32 and is fed to the follower amplifier via the semiconductor switch 10. The follower amplifier passes this analog measurement value to the A/D converter for conversion into a digital measurement value. The digital value is then stored in the read-write storage 42 with the address 000 as a data word with n-bit, compare with FIG. 3. A temperature region has now to be captured via a sensor element, herein denoted as Ni 1000, at the measurement input 2. The storage region 2' of the program storage 41 is programmed correspondingly. If the storage region 2' of the program storage 41 is addressed by the microprocessor of the control system, then the positioning of the semiconductor switches 11–28 occurs via switching logic 33 for the measurement input 2, as illustrated in FIG. 5. The semiconductor switches 10, 12, and 22 are closed.

A current flows via the semiconductor switch 22, corresponding to the constant current source 30 into the measurement input 2 via the sensor element, which in this case is Ni 1000, against the reference ground 9. The reference voltage generated thereby reaches the input amplifier 32 via the semiconductor switch 12 and, correspondingly amplified, reaches the follower amplifier 35 via the semiconductor switch 10.

The provision of the analog measurement value for conversion and storage of the digital measurement value in the read-write storage 42 under the address 001 controls the control unit 40.

In the context of the present invention the term "analog" represents a physical value. The opposite concept "digital" always refers to one of two possible states such as 0 or 1 or yes and no, while the term "analog" can assume values over a continuous range. The analogue measurement values are digitized to allow for reliable electronic measuring and processing.

If the storage region 3' of the program storage 41 is addressed by the microprocessor of the control system, compare FIG. 4, then the positioning of the semiconductor switches 11–28 occurs, as represented in FIG. 5, for the measurement input 3.

In this case, a current serves as an analog measurement value, which passes to the input amplifier via the semiconductor switch 13 and the semiconductor switch 19. The input of the input amplifier is switched via a reference resistor 36 against the reference ground 9. The correspondingly amplified measurement value based on the reference resistor 36 reaches the follower amplifier 35 via the semiconductor switch 20.

The provision of the analog measurement value by the follower amplifier 35, the conversion into a digital measurement value, and the storage under the address 010 in the read-write storage 42 of the control unit 40, is performed as it was done in the first two processing steps.

Advantageously, the A/D converter 34 operates according to the Wilkinson Principle, whereby an additional sample/hold circuit can be dispensed with. The Wilkinson principle is at times also called "ramp process" is for example described in the book "PC/XT/AT Messen-Steuern-Regeln - Angewandte Interface-Technik by Dr. Peter Wratil and Richard Schmidt published by Verlag Markt & Technik, Munich, Federal Republic of Germany 1987, page 117".

Alternatively or in addition, the method of successive approximation can be employed. The method of successive approximation is described together with a sample and hold circuit in the recited book PC-XT-AT Messen-Steuern-Regeln on page 121. Both the Wilkinson principle and the method of successive approximation can be employed, However, the Wilkinson principle appears to be associated with more advantages in the context of this invention.

According to the invention processing module 50, it is an advantage that the program storage 41 is provided with an additional storage region, wherein the user programs an amplification factor for each measurement value to be processed for adaptation to a uniform reference grid.

It will be understood that each of the elements described above, or two or more together, may also find a useful application in other types of processing devices differing from the types described above.

While the invention has been illustrated and described as embodied in the context of a digital processing device for analog input, it is not intended to be limited to the details shown, since various modifications may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A processing module for capturing of analog input signals comprising
    a measurement input;
    an input amplifier having an input connected to the measurement input;
    a follower amplifier having an input connected to the input amplifier and having an output;
    a control unit connected to the output of the follower amplifier and provided with a read-write storage, and with a data storage which includes its own storage region for a corresponding measurement input and for performing a multiplexing function;
    an input for the reception of analog signals where an analog signal range and the signal type is programmed as coordinated to a respective measurement input, where the measurement inputs are cyclically scanned according to the multiplexing function with respect to a measurement region, with respect to the signal type, and with respect to a momentary value of the analog <measurement parameter> signal type;
    semiconductor switches, connected to the measurement input and controlled by the control unit, are switched for each measurement input within a measurement cycle depending on the storage contents of the program storage; and
    an A/D converter connected to the control unit where the momentary value of the analog signal type is converted via the A/D converter and is written into the read-write storage of the control unit.

2. The processing module for capturing of analog input signals according to claim 1, further comprising
    an output connection of the read-write unit to operate microprocessing systems and storage-programmable controls by providing respective digital signals.

3. The processing module for capturing of analog input signals according to claim 1 wherein, the data storage is subdivided into storage regions, where the program content induces the A/D converter to convert all analog measurement values offered for conversion to a uniform base reference grid.

4. A processing module for capturing of analog input signals, in particular for microprocessing systems and storage-programmable controls, comprising one or more inputs for the reception of analog measurement signals;
    an input amplifier (32);
    a follower amplifier (35);
    an A/D converter (34);
    a control unit (40);
    wherein the improvement comprises that the control unit (40) is provided with a data storage (41) which is subdivided into its own storage regions (1'-8'), where an analog measurement value range and the analog signal type is stored to respective measurement input (1-8), where the measurement inputs (1-8) are cyclically scanned according to a multiplexing method with respect to a measurement region, with respect to the analog signal type, and with respect to a momentary value of a selected analog signal type, wherein semiconductor switches (11-28) are switched for each measurement input (1-8) within a measurement cycle depending on a storage contents of the program storage (41), and wherein the momentary value of the analog measurement signal is converted via the A/D converter (34) and is written into a read-write storage (42) of the control unit (40).

5. The processing module for capturing of analog input signals according to claim 4, wherein the program storage (41) is preferably provided with a storage region, where a data content induces the A/D converter (34) to convert all analog signals offered for conversion to a uniform base reference grid.

6. A method for capturing of analog input signals in a processing module for microprocessing systems and storage-programmable controls comprising
    entering an analog input signal representing analog signals into one or more measurement inputs for the reception of analog signals;
    feeding the analog input signal from the measurement input to an input amplifier;
    feeding an output from the input amplifier to a follower amplifier;

feeding an output from the follower amplifier to an A/D converter;

feeding an output from the follower amplifier to a control unit;

storing instructions in a data storage forming part of the control unit, which program storage includes a storage region proper for a respective analog signal input, where the instructions in the data storage programs an analog measurement value range and the signal type as coordinated to the respective measurement input;

multiplexing the signals coming from the follower amplifier in the control unit; cyclically scanning the measurement inputs according to a multiplexing method with respect to a measurement region, with respect to the signal type, and with respect to a momentary value of the signal type;

switching semiconductor switches for each measurement input within a measurement cycle depending on the storage contents of the data storage;

converting a momentary value of the analog signal via an A/D converter; and writing the converted momentary value of the analog signal into a read-write storage of a control unit.

7. The method for capturing of analog input signals in a processing module according to claim 6 further comprising inducing the A/D converter to convert all analog signals offered for conversion to a uniform base reference grid based on a data content.

8. A processing module for the capturing of analog input signals, in particular for microprocessor systems and storage programmable control system comprising an input amplifier;

a sequential amplifier;

an analog to digital converter;

a control unit;

an input for receiving of analog signals, where the control unit includes a program storage section, which has available for each measurement input present via a storage region suitable for the storage of operating parameters coordinated to each input signal, wherein the measurement inputs 1 to 8 are cyclically scanned in a multiplex method relative to measurement region, signal type and momentary value of the analog signal and where the momentary value of the analog signal is converted by an A/D converter (34) and is read into a read/write storage (42) of a control unit (40).

9. A processing module for capturing of analog input signals comprising a measurement input for receiving analog signals;

an input amplifier having an input connected to the measurement input;

a follower amplifier having an input connected to the input amplifier and having an output;

a control unit connected to the output of the follower amplifier and provided with a read-write storage, and with a data storage which includes its own storage region for a corresponding measurement input and for performing a multiplexing function;

an input for the reception of analog signals where an analog signal range and the signal type is programmed as coordinated to a respective measurement input, where the measurement inputs are cyclically scanned according to the multiplexing function with respect to a measurement region, with respect to the signal type, and with respect to a momentary value of the analog signal type;

semiconductor switches, connected to the measurement input and controlled by the control unit, are switched for each measurement input within a measurement cycle depending on the instructions in the storage contents of the data storage; and an A/D converter connected to the control unit wherein the momentary value of the analog signal type is converted via the A/D converter and is written into the read-write storage of the control unit.

10. The processing module for capturing of analog input signals according to claim 9, comprising an output connection of the read-write unit to operate microprocessing systems and storage-programmable controls by providing respective digital signals for final control elements.

11. The processing module for capturing of analog input signals according to claim 9 wherein, the data storage is subdivided into storage regions, where the program content induces the A/D converter to convert all analog measurement values offered for conversion to a uniform base reference grid.

12. The processing module for capturing of analog input signals according to claim 9 wherein the semiconductor switches are Metal-Oxide Semiconductor MOS devices.

13. The processing module for capturing of analog input signals according to claim 9 further comprising an external programming device for writing to the data storage.

14. The processing module for capturing of analog input signals according to claim 9 further comprising an address and data bus connected to the control unit for offering digital signals to the read-write storage of the control unit.

15. The processing module for capturing of analog input signals according to claim 9 further comprising a conversion unit connected to the measurement inputs for coordinating a digital signal to an analog input signal.

* * * * *